United States Patent
Zhan et al.

(10) Patent No.: US 11,891,300 B2
(45) Date of Patent: Feb. 6, 2024

(54) CLEAN LIQUID FUELS HYDROGEN CARRIER PROCESSES

(71) Applicant: CHEVRON U.S.A. INC., San Ramon, CA (US)

(72) Inventors: Bi-Zeng Zhan, San Ramon, CA (US); Steven Xuqi Song, San Ramon, CA (US); Trenton Otto, San Ramon, CA (US); Yaofan Yi, San Ramon, CA (US)

(73) Assignee: Chevron U.S.A. INC., San Ramon, CA (US)

( * ) Notice: Subject to any disclaimer, the term of this patent is extended or adjusted under 35 U.S.C. 154(b) by 227 days.

(21) Appl. No.: 17/516,049

(22) Filed: Nov. 1, 2021

(65) Prior Publication Data
US 2023/0140581 A1    May 4, 2023

(51) Int. Cl.
*C01B 3/00* (2006.01)
*C10G 69/02* (2006.01)

(52) U.S. Cl.
CPC ............ *C01B 3/0015* (2013.01); *C10G 69/02* (2013.01); *C01B 2203/065* (2013.01); *C01B 2203/1247* (2013.01); *C10G 2300/202* (2013.01); *C10G 2300/301* (2013.01); *C10G 2300/307* (2013.01); *C10G 2300/308* (2013.01); *C10G 2300/4018* (2013.01)

(58) Field of Classification Search
CPC ............ C01B 3/0015; C01B 2203/065; C01B 2203/1247; C10G 69/02; C10G 2300/202; C10G 2300/301; C10G 2300/307; C10G 2300/308; C10G 2300/4018; C10G 35/04; C10G 65/12; C10G 69/06
See application file for complete search history.

(56) References Cited

U.S. PATENT DOCUMENTS

| | | | |
|---|---|---|---|
| 2009/0288988 A1* | 11/2009 | Mayeur | C10G 3/60 422/198 |
| 2011/0207979 A1 | 8/2011 | Kim et al. | |
| 2012/0321549 A1* | 12/2012 | Okada | H01M 8/065 423/651 |
| 2015/0266731 A1 | 9/2015 | Boesmann et al. | |

(Continued)

FOREIGN PATENT DOCUMENTS

| | | |
|---|---|---|
| WO | 2015075045 A1 | 5/2015 |
| WO | 2020161723 A1 | 8/2020 |
| WO | 2020224584 A1 | 11/2020 |

OTHER PUBLICATIONS

International Search Report and Written Opinion dated Feb. 7, 2023 issued in PCT/US2022/45892.

*Primary Examiner* — Randy Boyer
*Assistant Examiner* — Juan C Valencia
(74) *Attorney, Agent, or Firm* — Hunton Andrews Kurth LLP

(57) ABSTRACT

The present disclosure refers in one embodiment to processes for making and transporting clean hydrogen fuel. The processes may involve hydrotreating, hydrocracking, or both hydrotreating and hydrocracking an aromatic feedstock under conditions to obtain a liquid hydrocarbon fuel. The liquid hydrocarbon fuel is hydrogenated to obtain a hydrogen-rich fuel that is transported to a dehydrogenation facility that may also be at or near a hydrogen station. The hydrogen-rich fuel is used to obtain hydrogen and a second liquid hydrocarbon fuel.

18 Claims, 1 Drawing Sheet

(56) References Cited

U.S. PATENT DOCUMENTS

2015/0267130 A1\* 9/2015 Butley ................... C10G 65/08
568/321
2017/0058208 A1 3/2017 Mahmoud et al.
2021/0062099 A1\* 3/2021 Frey ....................... C10G 69/10

\* cited by examiner

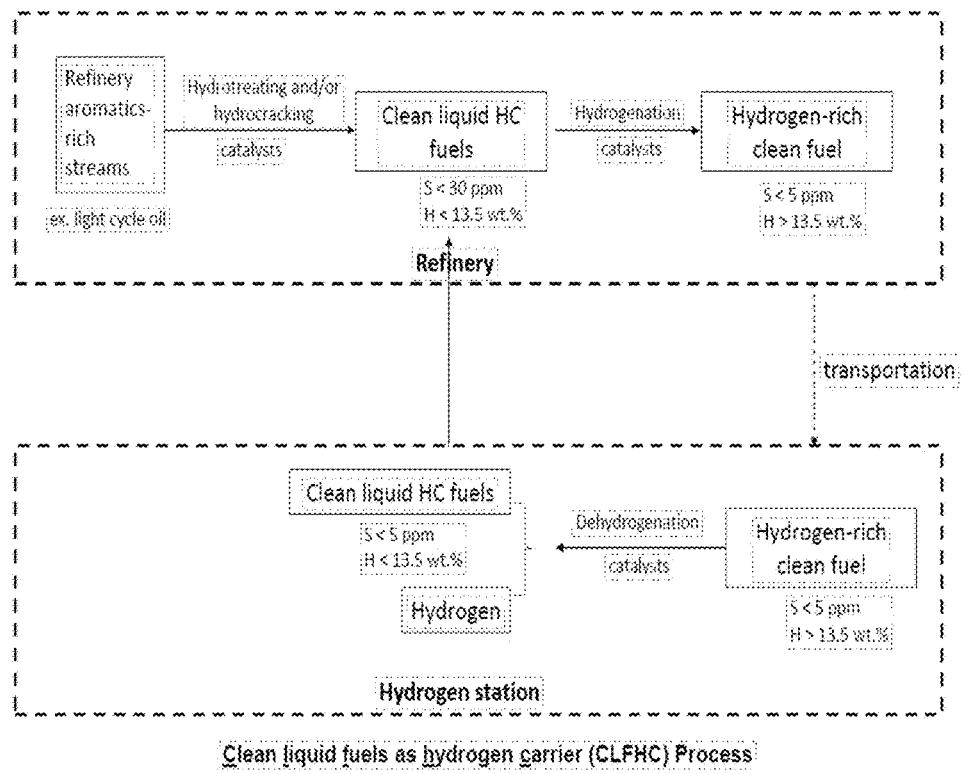

CLEAN LIQUID FUELS HYDROGEN CARRIER PROCESSES

FIELD OF THE DISCLOSURE

The present disclosure relates to clean liquid fuels hydrogen carrier processes.

BACKGROUND AND SUMMARY

Hydrogen is widely considered to be a clean fuel because when consumed in, for example, a fuel cell, water is the only by-product. Hydrogen can be produced from a variety of processes and readily available resources including, for example, natural gas, biomass, and nuclear power. Therefore, hydrogen may potentially be used in cars, as well as electricity generation applications. Unfortunately, the world has been slow to adopt hydrogen applications primarily because storage and transportation from its production location to, for example, a hydrogen gas station are very costly.

What is needed are new methods of producing and/or transporting hydrogen. It would be advantageous if such methods were cost-effective. It would also be advantageous if such methods could be employed using existing refinery processes and equipment. It would further be advantageous if the hydrogen produced had relatively low amounts of impurities such as sulfur, light hydrocarbon gases such as C1 to C4 hydrocarbons, and/or CO. Additionally or alternatively, it would be desirable if the new processes did not require recycling of, for example, hydrogen carriers, and/or the hydrogen could be transported using, for example, existing distribution infrastructure (e.g., shipping vessels, trucks, and the like).

The present application pertains to new methods of producing and/or transporting hydrogen. Advantageously, the methods may be cost-effective and/or employed using existing refinery processes and equipment. In addition, the hydrogen produced may have relatively low amounts of impurities such as sulfur. Also, in many embodiments the processes do not require recycling of hydrogen carriers which, of course, may be sold as products if not recycled. Furthermore, the hydrogen produced in the methods described herein may be transported using, for example, existing distribution infrastructure.

The present application pertains in one embodiment to a process comprising hydrotreating, hydrocracking, or both hydrotreating and hydrocracking an aromatic feedstock under conditions to obtain a liquid hydrocarbon fuel comprising less than about 30 ppm sulfur and less than about 13.5 wt. % hydrogen. The liquid hydrocarbon fuel is hydrogenated under conditions to obtain a hydrogen-rich fuel comprising less than about 5 ppm sulfur and greater than about 13.5 wt. % hydrogen. The hydrogen-rich fuel is transported to a dehydrogenation facility where it is dehydrogenated under conditions to obtain hydrogen and a second liquid hydrocarbon fuel comprising less than about 5 ppm sulfur and less than about 13.5 wt. % hydrogen.

In another embodiment the application pertains to a process comprising hydrogenating an aromatic feedstock comprising less than 50 ppm sulfur under conditions to obtain a hydrogen-rich fuel comprising less than about 1 ppm sulfur and greater than about 13.5 wt. % hydrogen. The hydrogen-rich fuel is transported to a dehydrogenation facility where it is dehydrogenated under conditions to obtain hydrogen and a second liquid hydrocarbon fuel comprising less than about 5 ppm sulfur and less than about 13.5 wt. % hydrogen.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

FIG. 1 shows a representative producing and delivering hydrogen to a hydrogen station or other desired facility.

DETAILED DESCRIPTION

The following description of embodiments provides non-limiting representative examples to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Definitions

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"Treatment," "treated," "upgrade," "upgrading" and "upgraded," when used in conjunction with an oil feedstock, describes a feedstock that is being or has been subjected to hydroprocessing, or a resulting material or crude product, having a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

"Hydroprocessing" refers to a process in which a carbonaceous feedstock is brought into contact with hydrogen and a catalyst, at a higher temperature and pressure, for the purpose of removing undesirable impurities and/or converting the feedstock to a desired product. Examples of hydroprocessing processes include hydrocracking, hydrotreating, catalytic dewaxing, and hydrofinishing.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Hydrotreating" refers to a process that converts sulfur and/or nitrogen-containing hydrocarbon feeds into hydrocarbon products with reduced sulfur and/or nitrogen content, typically in conjunction with hydrocracking, and which generates hydrogen sulfide and/or ammonia (respectively) as byproducts. Such processes or steps performed in the presence of hydrogen include hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved viscosities, viscosity indices, saturates content, low temperature properties, volatilities and depolarization, for example.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985). "Group 2" refers to IUPAC Group 2 elements, e.g., magnesium, (Mg), Calcium (Ca), Strontium (Sr), Barium (Ba) and combinations thereof in any of their elemental, compound, or ionic form. "Group 6" refers to IUPAC Group 6 elements, e.g., chromium (Cr), molybdenum (Mo), and tungsten (W). "Group 7" refers to IUPAC Group 7 elements, e.g., manganese (Mn), rhenium (Re) and combinations thereof in any of their elemental, compound, or ionic form. "Group 8" refers to IUPAC Group 8 elements, e.g., iron (Fe), ruthenium (Ru), osmium (Os) and combinations thereof in any of their elemental, compound, or ionic form. "Group 9" refers to IUPAC Group 9 elements, e.g., cobalt (Co), rhodium (Rh), iridium (Ir) and combinations thereof in any of their elemental, compound, or ionic form. "Group 10" refers to IUPAC Group 10 elements, e.g., nickel (Ni), palladium (Pd), platinum (Pt) and combinations thereof in any of their elemental, compound, or ionic form. "Group 14" refers to IUPAC Group 14 elements, e.g., germanium (Ge), tin (Sn), lead (Pb) and combinations thereof in any of their elemental, compound, or ionic form.

The term "support", particularly as used in the term "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and take into account experimental error and variations that would be expected by a person having ordinary skill in the art.

General Processes

The processes of the instant application vary depending upon the available feedstock, equipment, and desired product. While many different feedstocks may be employed the processes typically employ a refinery aromatic-rich stream, i.e., aromatic feedstock, such as a light cycle oil from, for example, a fluid catalytic cracking process stream. Properties of the aromatic feedstock such as a light cycle oil may also vary depending upon the origin of the stream and its prior processing, if any. Other aromatics-rich hydrocarbons are diesel products from coker, residuum desulfurization (RDS), etc. In one embodiment, the aromatics-rich hydrocarbon feedstock contains at least 50% of ring compounds (e.g. aromatics and naphthenes). In one embodiment, it contains at least 60% of ring compounds. It is preferred to have at least 65% of ring compounds. That is, suitable densities, sulfur content, cetane number, boiling point, aromatic content, and other properties of the aromatic feedstock such as a light cycle oil may vary with feedstock. Suitable densities of the aromatic feedstock vary and in the case of light cycle oil or other aromatic feedstock the density may be from about 900 to about 960 kg/m$^3$ (about 56 to about 60 lbs/ft$^3$). Depending upon the nature of the aromatic feedstock it may comprise sulfur or sulfur compounds. While a lower sulfur content may be desirable in some embodiments, the light cycle oil or other aromatic feedstock may comprise greater than about 1000, or greater than about 2000, or even greater than about 5,000 ppm. In some embodiments the light cycle oil or other aromatic feedstock may comprise nitrogen or nitrogen compounds. In some embodiments the light cycle oil or other aromatic feedstock may comprise a cetane number of greater than about 20, or greater than about 25, up to about 30, or up to about 35, or up to about 40. The boiling point of the light cycle oil or other aromatic feedstock will vary depending upon the specific processing to be employed but in some embodiments the boiling point may be less than about 430° C. (about 806° F.), or less than about 400° C. (about 752° F.) according to ASTM D-86.

Hydrotreating/Hydrocracking

The aromatic feedstock may be subjected to hydrotreating, hydrocracking, or both hydrotreating and hydrocracking under conditions to obtain a clean liquid hydrocarbon fuel that may, for example, meet specifications for use as a diesel or aviation fuel. The properties of the resulting liquid hydrocarbon fuel may vary but often comprise less than about 60, less than about 50, or less than about 40, or less than about 30, or less than about 20 ppm sulfur and/or less than about 10, or less than about 5, or less than 10 ppm N or less than about 13.5 wt. % hydrogen. The liquid hydrocarbon fuel may be referred to in some cases as a clean liquid HC fuel as shown in FIG. 1. In some cases, the aromatic feedstock may already comprise properties similar enough to the desired liquid hydrocarbon fuel, e.g., less than 50 ppm sulfur, such that hydrotreating and/or hydrocracking may not be necessary. In such cases the aromatic feedstock may be directly hydrogenated without hydrotreating and/or hydrocracking for the liquid hydrocarbon fuel.

Typically, for either hydrotreating or hydrocracking, the reaction temperature may be between about 250° C. (482° F.) and about 500° C. (932° F.), pressures from about 3.5 MPa (500 psi) to about 24.2 MPa (3,500 psi), and a feed rate (vol oil/vol cat hr) of from about 0.1. to about 20 $hr^{-1}$. Hydrogen circulation rates are generally in the range from about 350 std liters $H_2$/kg oil (2,310 standard cubic feet per barrel; SCF/B) to 1780 std liters $H_2$/kg oil (11,750 standard cubic feet per barrel). Preferred reaction temperatures may range from about 340° C. (644° F.) to about 455° C. (851° F.). Preferred total reaction pressures may range from about 7.0 MPa (1,000 psi) to about 20.7 MPa (3,000 psi). The reactors may also be operated in any suitable catalyst-bed arrangement mode, for example, fixed bed, slurry bed, or ebulating bed although fixed bed, co-current downflow may often be utilized.

In one embodiment, the process is operated by conducting the feedstock, which may contain high levels of sulfur and nitrogen, to the initial hydrotreatment reaction stage to convert a substantial amount of the sulfur and nitrogen in the feed to inorganic form with a major objective in this step being a reduction of the feed sulfur content. Of course, if hydrotreatment is not needed, then the feed may be passed directly to hydrocracking or hydroprocessing.

The hydrotreatment step is usually carried out in one or more reaction zones (catalyst beds), in the presence of hydrogen and a hydrotreating catalyst. The conditions used are appropriate to hydrodesulfurization and/or denitrogenation depending on the feed characteristics. If hydrocracking is to be employed, then the product stream is then passed to the hydrocracking stage in which boiling range conversion is affected. If desired, the stream of hydrotreated and/or hydrocracked liquid hydrocarbons together with hydrogen treat gas and other hydrotreating/hydrocracking reaction products potentially including hydrogen sulfide and ammonia, may be passed to separators, such as a distillation column, in which hydrogen, light ends, and inorganic nitrogen and hydrogen sulfide are removed from the hydrocracked liquid product stream. The recycle hydrogen gas can be washed to remove ammonia and may be subjected to an amine scrub to remove hydrogen sulfide in order to improve the purity of the recycled hydrogen and reduce product sulfur levels. If desired a bed of hydrodesulfurization catalyst, such as a bulk multimetallic catalyst, may be provided at some point prior to hydrogenation.

Hydrotreating Catalysts

Conventional hydrotreating catalysts may be any suitable catalyst. Typical conventional hydrotreating catalysts include those that are comprised of at least one Group VIII metal, preferably Fe, Co or Ni, more preferably Co and/or Ni, and most preferably Ni; and at least one Group VIB metal, preferably Mo or W, more preferably Mo, on a relatively high surface area support material, preferably alumina. Other suitable hydrodesulfurization catalyst supports include zeolites, amorphous silica-alumina, and titania-alumina. Noble metal catalysts can also be employed, preferably when the noble metal is selected from Pd and Pt. More than one type of hydrodesulfurization catalyst may be used in different beds in the same reaction vessel. The Group VIII metal is typically present in an amount ranging from about 2 to about 20 wt. %, preferably from about 4 to about 12 wt. %. The Group VIB metal will typically be present in an amount ranging from about 5 to about 50 wt. %, preferably from about 10 to about 40 wt. %, and more preferably from about 20 to about 30 wt. %. All metals weight percents are based on the weight of the catalyst.

Hydrocracking Catalysts

Examples of conventional hydrocracking catalysts which can be used include nickel, nickel-cobalt-molybdenum, nickel-cobalt-tungsten, nickel-molybdenum-tungsten, cobalt-molybdenum and nickel-tungsten and/or nickel-molybdenum, the latter two of which are preferred. Non-limiting examples of noble metal catalysts include those based on platinum and/or palladium. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports, especially the large pore faujasites such as USY and beta zeolites can also be used.

A large number of hydrocracking catalysts are available from different commercial suppliers and may be used according to feedstock and product requirements; their functionalities may be determined empirically. The choice of hydrocracking catalyst is not critical. Any catalyst with the desired hydroconversion functionality at the selected operating conditions can be used, including conventional hydrocracking catalysts. As described above, the hydrotreating and/or hydrocracking, if any, are conducted under conditions suitable to obtain a liquid hydrocarbon fuel with the aforementioned properties that may include, for example, less than about 30 ppm sulfur and less than about 13.5 wt. % hydrogen.

Hydrogenating

The liquid hydrocarbon fuel with the properties as described above is then hydrogenated. The hydrogenating conditions may vary but usually are selected in order to obtain a hydrogen-rich fuel comprising less than about 5, or less than about 2, or less than about 1, or about 0 ppm sulfur with a greater amount of hydrogen than the starting liquid hydrocarbon fuel. The hydrogenation generally does not change ring-structure, but rather, converts aromatic compounds to naphthenic compounds. The amount of hydrogen in the resulting hydrogen-rich fuel may be greater than about 13.5, or greater than about 13.8, or greater than about 14.0, or greater than about 14.5 wt. % or even more hydrogen.

The hydrogenating may be accomplished by any means that achieves the desired hydrogen-rich fuel. In an embodiment, the liquid hydrocarbon fuel can be hydrogenated by reaction with hydrogen gas with a catalyst under conditions capable of hydrogenating.

In an embodiment, the hydrogenation catalyst can comprise, or consist essentially of, a supported Group 7, 8, 9, and 10 metals. In some embodiments, the hydrogenation catalyst can be selected from the group consisting of one or more of Ni, Cu, Ag, Pd, Pt, Co, Rh, Fe, Ru, Os, Cr, Sn, Mo, and W, supported on silica, alumina, silica-alumina, clay, titania, zirconia, or a mixed metal oxide supports. In other embodiments, the hydrogenation catalyst can be nickel supported on kieselguhr, platinum and/or palladium supported on alumina, or nickel and/or platinum and/or palladium supported on alumina; alternatively, nickel supported on kieselguhr, alternatively, nickel and/or platinum and/or palladium supported on silica; or alternatively, cobalt-molybdenum supported on alumina. In yet other embodiments, the hydrogenation catalyst can be one or more of the group consisting of nickel supported on kieselguhr, silica, alumina, clay or silica-alumina.

Generally, the hydrogenation can be performed in any type of process and/or reactor which can hydrogenate to the desired properties of the hydrogen-rich fuel. In an embodiment, the hydrogenation can be performed in a batch process, a continuous process; or any combination thereof, alternatively a batch process; or alternatively a continuous process. In some embodiments, the hydrogenation can be performed in a slurry reactor, a continuous stirred tank reactor, a fixed bed reactor, or any combination thereof; alternatively, a slurry reactor, alternatively, a continuous stirred tank reactor, or alternatively, a fixed bed reactor.

If desired, the hydrogenated hydrogen-rich fuel can be filtered to separate the hydrogenation catalyst and/or catalyst fines from the hydrogen-rich fuel. Further, the hydrogen-rich fuel can be distilled to further purify it or to separate a high hydrogen-rich fuel.

The quantity of hydrogenation catalyst utilized can be dependent upon the identity of the hydrogenation catalyst and the particular hydrogenation process utilized. Generally, the amount of hydrogenation catalyst used can be any amount which can produce the desired hydrogen-rich fuel. In a non-fixed bed hydrogenation process (e.g., slurry reactors or continuous stirred tank reactors, among others), the amount of hydrogenation catalyst used in the hydrogenation can range from 0.001 wt. % to 20 wt. %, from 0.01 wt. % to 15 wt. %, from 0.1 wt. % to 10 wt. %, or from 1 wt. % to 5 wt. %. The wt. % of the hydrogenation catalyst is based upon the total weight of the hydrogenation catalyst and the liquid hydrocarbon fuel subjected to hydrogenation.

Generally, the conditions capable of hydrogenating the liquid hydrocarbon fuel can comprise a hydrogen pressure, a temperature, a contact time, or any combination thereof; alternatively, a hydrogen pressure and a temperature; alternatively, a hydrogen pressure, a temperature, and a contact time; alternatively, a hydrogen pressure; alternatively, a temperature; or alternatively, a contact time. In an embodiment, the temperature of the hydrogenation that can be utilized can range from 25° C. (77° F.) to 350° C. (662° F.), from 50° C. (122° F.) to 300° C. (572° F.), from 60° C. (140° F.) to 250° C. (482° F.), or from 70° C. (158° F.) to 200° C. (392° F.). In an embodiment, the hydrogen pressure that can be utilized can range from 100 kPa (14 psi) to 30 MPa (4351 psi), from 250 kPa (36 psi) to 20 MPa (2901 psi), from 500 kPa (72 psi) to 10 MPa (1450 psi), or from 750 kPa (109 psi) to 5 MPa (725 psi). In an embodiment, the contact time that can be utilized can range from 1 minute to 100 hours, from 2 minutes to 50 hours, from 5 minutes to 25 hours, or from 10 minutes to 10 hours. In a fixed bed process, the WHSV (weight hourly space velocity) of the liquid hydrocarbon fuel over the hydrogenation catalyst can range from 0.1 to 20, from 0.5 to 10, or from 1 to 5.

In some embodiments the hydrogenating step generates significantly more heat than standard hydroprocessing. Accordingly, at least a portion of the heat may be recycled and used in, for example, the hydrotreating/hydrocracking step(s).

The hydrogen-rich fuel produced by hydrogenating may then be transported, if desired.

Transporting

If desired, the hydrogen-rich fuel is typically transported to a dehydrogenation facility in any convenient manner. Advantageously, the hydrogen-rich fuel may be transported using, for example, existing distribution infrastructure. Such existing distribution infrastructure includes via tanker (oil or chemical), container ship, truck, railroad tank car, pipeline, and/or any combination thereof.

Dehydrogenating

After transporting, the hydrogen-rich fuel is dehydrogenated to obtain hydrogen and a second liquid hydrocarbon fuel. Typically, the dehydrogenating is conducted under conditions to obtain hydrogen and a second liquid hydrocarbon fuel comprising less than about 5, or less than about 2, or less than about 1, or about 0 ppm sulfur and less than about 13.5 wt. % hydrogen and requires adding a fair amount of heat to accomplish the dehydrogenating.

The hydrogen-rich fuel is typically contacted with a catalytic composite in a dehydrogenation reactor at dehydrogenation conditions. This contacting may be accomplished in a fixed catalyst bed system, a moving catalyst bed system, a fluidized bed system, or in a batch-type operation. The dehydrogenation reactor itself may comprise one or more separate reactor zones with heating means therebetween to ensure that the temperature can be maintained at the entrance to each reaction zone to obtain the desired conversion. The hydrogen-rich fuel may be contacted with the catalyst composite in either upward, downward or radial flow fashion. The hydrogen-rich fuel may be in the liquid phase, a mixed vapor-liquid phase or the vapor phase when it contacts the catalyst.

Dehydrogenation conditions vary and may include a temperature of from about 300° F. (149° C.) to about 1500° F. (816° C.), a pressure of from about 0.1 kPa (0.01 psi) to about 2533 kPa (367 psi) and a liquid hourly space velocity (LHSV) of about 0.01 to about 50 hr$^{-1}$. Preferred temperatures may be from about 350° F. (177° C.) to about 900° F. (482° C.), more preferably, about 400° F. (204° C.) to about 800° F. (427° C.), and most preferably 450° F. (232° C.) to 700° F. (371° C.). Preferred pressures may range from about 10 kPa (1.5 psi) to about 507 kPa (74 psi). Atmospheric pressure is very suitable in most processes and generally pressure in the dehydrogenation zone is maintained as low as practicable, consistent with equipment limitations, to maximize the chemical equilibrium advantages. Preferred LHSV values range from about 0.05 hr$^{-1}$ to about 10 hr$^{-1}$, or even more preferably, from about 0.1 to about 5 hr$^{-1}$. Of course, those skilled in the art will choose the desired temperature, pressure and LHSV depending on the properties of the hydrogen-rich fuel and catalyst systems utilized.

If desired, the hydrogen-rich fuel may be admixed with a diluent gas before, while or after being passed to the dehydrogenation zone. The diluent material may be hydrogen, steam, methane, carbon dioxide, nitrogen, argon or the like, or a mixture thereof. When a diluent gas is utilized, amounts sufficient to ensure a diluent gas to hydrocarbon mole ratio of about 0.1 to about 20, with best results being obtained when the mole ratio range is about 1 to 10. The diluent hydrogen stream passed to the dehydrogenation zone will typically be recycled after hydrogen being separated from the effluent of the dehydrogenation zone in the hydrogen separation zone.

The dehydrogenation catalyst composite may exhibit high activity, high selectivity and good stability. Dehydrogenation catalysts may be the same as or different from the hydrogenation catalysts described above. Particularly preferred catalytic composites of the present disclosure include those composites comprising Group VIII noble metals and a solid inorganic carrier. Such catalytic composites are well known to those skilled in the art as represented by U.S. Pat. Nos. 3,531,543; 3,631,215; 3,864,284; 3,584,060; 4,191,846; 4,716,143; 4,786,625; 4,827,072; and 4,902,849, the contents of which are incorporated herein by reference. Particularly preferred catalyst composites may comprise platinum, palladium, nickel, tin, and any combination thereof on alumina catalyst.

The dehydrogenated hydrogen-rich fuel yields hydrogen and a second liquid hydrocarbon fuel. If desired, the hydrogen and the second liquid hydrocarbon fuel may be separated. The hydrogen may be stored at a hydrogen station onsite or transported to a hydrogen station. The resulting second liquid hydrocarbon fuel may be recycled in any convenient manner. In one embodiment the recycling of the second liquid hydrocarbon fuel comprises mixing the second liquid hydrocarbon fuel with a liquid hydrocarbon fuel and then hydrogenating the mixed liquid hydrocarbon fuel.

Example 1: Properties of LCO

The physical properties of an LCO feedstock, i.e. ABQ3034, used for the study are given in Table 1. This LCO comprises about 63 vol. % aromatics. Approximately 80 vol. % of the molecules have a ring structure. Its hydrogen content is about 10.7% and thus is a good feedstock to store and carry hydrogen.

TABLE 1

A commercial LCO feedstock ABQ3034 and its hydrocracked product CGQ7699

| Sample ID | ABQ3034 | CGQ7699 |
|---|---|---|
| API at 60° F., (16° C.) | 21.7 | 34.5 |
| Density, g/mL | 0.924 | 0.852 |

TABLE 1-continued

A commercial LCO feedstock ABQ3034 and its hydrocracked product CGQ7699

| Sample ID | ABQ3034 | CGQ7699 |
|---|---|---|
| N, ppm | 682 | <0.3 |
| S, ppm | 2654 | <5 |
| Hydrogen by NMR, wt. % | 10.7 | 13.3 |
| 22 × 22 | | |
| Paraffins, vol. % | 14.6 | 25.1 |
| Naphthenes, vol. % | 17.7 | 53.6 |
| Aromatics, vol. % | 61.5 | 21.3 |
| Sulfur, vol. % | 6.2 | 0 |
| Simdist, wt. %/° F. | | |
| 0.5/5 | 233/391 | 295/378 |
| 10/30 | 442/511 | 400/459 |
| 50 | 566 | 510 |
| 70/90 | 625/700 | 570/674 |
| 95/99.5 | 730/796 | 714/797 |

Example 2: LCO Hydrotreating and Hydrocracking to Produce a Clean Liquid Fuel CGQ7699

As shown in the Table 1, LCO ABQ3034 contains over 2000 ppm of S and over 600 ppm of N. Both nitrogen and sulfur impurities are removed by hydroprocessing to produce clean liquid fuels. Hydro-denitrogenation and -desulfurization were conducted in a once-through standard hydroprocessing unit loaded with an ISOCRACKING™ catalyst system containing a conversion commercial hydrocracking pretreat catalysts ICR 514/1001 and hydrocracking catalyst ICR 183 under hydroprocessing conditions of 0.88 LHSV, 8000 SCF/B, 1400 psia (9653 kPa) hydrogen partial pressure, and 675° F. (357° C.) Catalyst Average Bed Temperature.

The hydroprocessed product was distilled into two fractions. The diesel range product (380° F.+boiling point, CGQ7699) was selected for the Clean Liquid Fuel Hydrogen Carrier study. Its physical properties are given in the Table 1. Results in Table 1 show that the produced clean liquid fuel CGQ7699 derived from LCO contained <0.3 ppm N and <5 ppm S. Its hydrogen content is about 13.2 wt. %. About 75 vol. % of hydrocarbons are molecules with ring structure, suitable for carrying hydrogen.

Example 3: Clean Liquid Fuel as Hydrogen Carrier

TABLE 2

Summary of hydrogenation and dehydrogenation of clean liquid fuel over a commercial noble metal catalyst ICR 419 (noble metals Pt-Pd on a silica-alumina support)

| | Hydrogenation | | | Dehydrogenation | | | |
|---|---|---|---|---|---|---|---|
| Time on stream, h | 432 | 600 | 768 | 936 | 1104 | 1320 | 1464 |
| Pressure, psig (MPa) | 1500(10342) | 1500(10342) | 1500(10342) | 225(1551) | 182(1255) | 61(420) | 64(441) |
| Gas:Oil, SCFB/B | 4896 | 4893 | 4892 | 4895 | 4891 | 1526 | 1530 |
| CAT Temperature, ° F. (° C.) | 475(246) | 500(260) | 550(288) | 550(288) | 600(316) | 650(343) | 700(371) |
| H content of liquid product, wt. % | 13.9 | 14.0 | 14.0 | 13.6 | 13.2 | 13.1 | 13.2 |

TABLE 2-continued

Summary of hydrogenation and dehydrogenation of clean liquid fuel over a
commercial noble metal catalyst ICR 419 (noble metals Pt-Pd on a silica-alumina support)

| | Hydrogenation | | | | Dehydrogenation | | |
|---|---|---|---|---|---|---|---|
| Properties of 500° F.– (260° C.) liquid product | | | | | | | |
| 1-ring aromatics, wt. % | <0.5 | <0.5 | <0.5 | 14.1 | 26 | 22.5 | 23.5 |
| 2+-ring aromatics, wt. % | <0.5 | <0.5 | <0.5 | 0.9 | 3.1 | 6.6 | 6 |
| Total aromatics, wt. % | 0 | 0 | 0 | 15 | 29.1 | 29.1 | 29.4 |
| H content, wt. % | 13.8 | 13.8 | 13.8 | 13.4 | 12.9 | 12.8 | 12.9 |
| Properties of 500° F.+ (260° C.) liquid product | | | | | | | |
| 1-ring aromatics, wt % | <0.5 | <0.5 | <0.5 | 5.8 | 11 | 9.4 | 9.3 |
| 2+-ring aromatics, wt. % | <0.5 | <0.5 | <0.5 | 3 | 6.8 | 9.7 | 8.6 |
| Total aromatics, wt. % | <1.0 | <1.0 | <1.0 | 8.8 | 17.8 | 19.1 | 18 |
| H content, wt. % | 14.1 | 14.1 | 14.2 | 13.9 | 13.6 | 13.4 | 13.5 |

Process conditions: 1.0 LHSV, run feed CGQ7699 clean liquid fuel.

Results in Table 2 show that ICR 419 further saturates aromatics in the clean liquid fuel CGQ7699 to less than 1 wt. % in the resulting liquid fuels containing ≥13.9 wt. % hydrogen. It also shows that ICR 419 can also produce hydrogen from the hydrogen-rich liquid fuel by dehydrogenation, resulting in liquid fuel containing ≤13.2 wt. % hydrogen under the process conditions.

Example 4: Clean Liquid Fuel as Hydrogen Carrier

Results in Table 3 show that ICR 731 can saturates aromatics in the clean liquid fuel CGQ7699 to less than 1 wt. %. The resulting liquid fuels contained ≥13.9 wt. % hydrogen. It also shows that ICR 731 can also produce hydrogen from the clean liquid fuel resulting in liquid fuel containing ≤13.0 wt. % hydrogen.

FIG. 1 shows an embodiment of the instant application wherein a light cycle oil is hydrotreated and/or hydrocracked to a liquid hydrocarbon fuel which is hydrogenated to a hydrogen-rich clean fuel. The hydrogen-rich clean fuel can

TABLE 3

Summary of hydrogenation and dehydrogenation of clean liquid fuel over a
commercial noble metal catalyst ICR 731 (noble metals Pt-Pd on an alumina support)

| Time on stream, h | 306 | 474 | 642 | 810 | 1026 | 1314 | 1482 |
|---|---|---|---|---|---|---|---|
| Pressure, psig (kPa) | 1500(10342) | 1500(10342) | 1500(10342) | 1500(10342) | 65(448) | 67(462) | 65(448) |
| Gas:Oil, SCF/B | 4885 | 4884 | 4887 | 4888 | 4887 | 4889 | 4884 |
| CAT Temperature, ° F. (° C.) | 450(232) | 475(246) | 500(260) | 550(288) | 550(288) | 650(343) | 700(371) |
| H content of liquid product, wt. % | 14.0 | 14.0 | 13.9 | 13.9 | 13.0 | 12.8 | 12.8 |
| Properties of 500° F.– (260° C.) liquid product | | | | | | | |
| 1-ring aromatics, wt % | <0.5 | <0.5 | <0.5 | <0.5 | 28.6 | 27.1 | 27.4 |
| 2+-ring aromatics, wt. % | <0.5 | <0.5 | <0.5 | <0.5 | 5.9 | 9.3 | 9.6 |
| Total aromatics, wt. % | 0 | 0 | 0 | 0 | 34.5 | 36.4 | 37.0 |
| Hydrogen content, wt. % | 13.8 | 13.8 | 13.8 | 13.8 | 12.7 | 12.5 | 12.5 |
| Properties of 500° F.+ (260° C.) liquid product | | | | | | | |
| 1-ring aromatics, wt % | <0.5 | <0.5 | <0.5 | <0.5 | 12.6 | 14.0 | 13.8 |
| 2+-ring aromatics, wt. % | <0.5 | <0.5 | <0.5 | <0.5 | 10.4 | 15.4 | 15.8 |
| Total aromatics, wt. % | 0 | 0 | 0 | 0 | 23.0 | 29.4 | 29.6 |
| Hydrogen content, wt. % | 14.1 | 14.1 | 14.1 | 14.1 | 13.3 | 13.0 | 13.0 |

Process conditions: 1.0 LHSV, run feed CGQ7699 clean liquid fuel.

then be transported much like a liquid organic hydrogen carrier (e.g., dibenzyl toluene) without the recycling required by liquid organic hydrogen carriers. After transport, hydrogen and a clean liquid hydrocarbon fuel are generated with dehydrogenation.

In the preceding specification, various embodiments have been described. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A process comprising:
    hydrotreating, hydrocracking, or both hydrotreating and hydrocracking an aromatic feedstock under conditions to obtain a liquid hydrocarbon fuel comprising less than about 30 ppm sulfur and less than about 13.5 wt. % hydrogen;
    hydrogenating the liquid hydrocarbon fuel under conditions to obtain a hydrogen-rich fuel comprising less than about 1 ppm sulfur and greater than about 14.5 wt. % hydrogen;
    transporting the hydrogen-rich fuel to a dehydrogenation facility;
    dehydrogenating the hydrogen-rich fuel under conditions to obtain hydrogen and a second liquid hydrocarbon fuel comprising less than about 30 ppm sulfur and less than about 13.5 wt. % hydrogen;
    separating the hydrogen and the second liquid hydrocarbon fuel; and
    recycling the second liquid hydrocarbon fuel.

2. The process of claim 1 wherein the aromatic feedstock comprises a hydrocarbon from a fluid catalytic cracking process.

3. The process of claim 1 wherein the aromatic feedstock comprises a light cycle oil.

4. The process of claim 3 wherein the light cycle oil comprises greater than about 9,000 ppm sulfur.

5. The process of claim 4 wherein the light cycle oil comprises a density of from about 900 to about 960 kg/m³.

6. The process of claim 4 wherein the light cycle oil comprises a cetane number of from about 20 to about 30.

7. The process of claim 4 wherein the light cycle oil comprises a boiling point of less than about 345° C. according to ASTM D-86.

8. The process of claim 1 further comprising transporting the hydrogen to a hydrogen station.

9. The process of claim 1 wherein the recycling of the second liquid hydrocarbon fuel comprises mixing the second liquid hydrocarbon fuel with a liquid hydrocarbon fuel and then hydrogenating the mixed liquid hydrocarbon fuel.

10. The process of claim 1 wherein the conditions employed for hydrotreating, hydrocracking, or both hydrotreating and hydrocracking comprise conditions suitable for removing nitrogen.

11. The process of claim 1 further comprising recycling at least a portion of any heat generated in the hydrogenating step.

12. A process comprising:
    hydrogenating an aromatic feedstock comprising less than 50 ppm sulfur under conditions to obtain a hydrogen-rich fuel comprising less than about 1 ppm sulfur and greater than about 14.5 wt. % hydrogen;
    transporting the hydrogen-rich fuel to a dehydrogenation facility;
    dehydrogenating the hydrogen-rich fuel under conditions to obtain hydrogen and a second liquid hydrocarbon fuel comprising less than about 30 ppm sulfur and less than about 13.5 wt. % hydrogen;
separating the hydrogen and the second liquid hydrocarbon fuel; and
recycling the second liquid hydrocarbon fuel.

13. The process of claim 12 wherein the aromatic feedstock comprises a hydrocarbon from a fluid catalytic cracking process.

14. The process of claim 12 wherein the aromatic feedstock comprises a light cycle oil.

15. The process of claim 14 wherein the light cycle oil comprises greater than about 9,000 ppm sulfur.

16. The process of claim 14 wherein the light cycle oil comprises a density of from about 900 to about 960 kg/m³.

17. The process of claim 14 wherein the light cycle oil comprises a cetane number of from about 20 to about 30.

18. The process of claim 14 wherein the light cycle oil comprises a boiling point of less than about 345° C. according to ASTM D-86.

* * * * *